United States Patent [19]
Ishikawa

[11] 3,736,850
[45] June 5, 1973

[54] SINGLE-LENS REFLEX CAMERA PROVIDED WITH A DATA PHOTOGRAPHING DEVICE

[75] Inventor: Mitsuo Ishikawa, Kawasaki, Japan

[73] Assignee: Canon Kabushiki Kaisha, Tokyo, Japan

[22] Filed: Dec. 22, 1971

[21] Appl. No.: 210,757

[30] Foreign Application Priority Data

Dec. 28, 1970 Japan ..............................45/123916

[52] U.S. Cl. ..........................................95/1.1, 95/42
[51] Int. Cl. ..........................................G03b 17/24
[58] Field of Search ..............................95/1.1, 42

[56] References Cited
UNITED STATES PATENTS 3,590,703  7/1971  Ono..........................................95/42

*Primary Examiner*—John M. Horan
*Attorney*—Milton J. Wayne

[57] ABSTRACT

A single-lens reflex camera provided with a data photographing device which comprises a mirror movable up and down in response to shutter operation. The mirror is disposed in a data-photographing optical path and may be maintained in raised position for a predetermined time, during which the image of data illuminated by a light source may be projected and recorded under proper exposure on the surface of a sensitive film simultaneously with object-photographing.

6 Claims, 5 Drawing Figures

SINGLE-LENS REFLEX CAMERA PROVIDED WITH A DATA PHOTOGRAPHING DEVICE

BACKGROUND OF THE INVENTION

1. Field of the Invention

This invention relates to a single-lens reflex camera provided with a data photographing device, and more particularly to such a camera with which the image of an object to be photographed and the image of picture data can be photographed simultaneously on a common film.

2. Description of the Prior Art

There are known photographic cameras of the type with which the image of an object to be photographed and the image of picture data such as the ordinal number of the object, the ordinal number of the picture thereof, the photographic conditions (shutter speed and F-number used), the date of the picture, etc. can be photographed simultaneously. With most cameras of this type, exposure for the image of picture data is effected simultaneously with exposure for the image of an object to be photographed so that the image of the data may appear at a part or a margin of the image of the object formed on a sensitive film.

For example, the data photographing device as disclosed in U.S. Pat. No. 3216339 is such that a data strip carrying data thereon is inserted immediately in front of a sensitive film so that the data on the data strip are photographed at one side edge of the picture of the object by using part of the object light when the film is exposed to such light. British Pat. Nos. 672967 and 673007 disclose devices of the type which use no object light for photographing the picture data but employ a discrete light source for exclusively illuminating the data to take the picture thereof on a sensitive film. The system of the latter type has merit in that the picture of the data can be clearly recorded on the film by virtue of the discrete light source irrespective of low brightness of the object light, but it suffers from a disadvantage in that pictures of various data cannot be taken with a uniform density for all objects because brightness is actually variable in a very wide range from object to object. The reason for this is that when the image of an object and the image of picture data are simultaneously recorded on a sensitive film by the opening and closing of a shutter provided in the camera, the time required for such opening and closing of the shutter, i.e., the shutter speed is set in accordance with the brightness of the object being photographed. As the result, proper exposure is attained on the sensitive film for the image of the object, whereas overexposure tends to occur for the image of the data illuminated by the auxiliary light source of uniform brightness if the object is of low brightness, because a longer shutter opening and closing time is selected in accordance with the low brightness of the object. Conversely, where the object to be photographed is of high brightness, underexposure would occur on the sensitive film for the image of data because a shorter shutter time is selected in such cases. In any event, proper exposure on the film could not be attained for the image of the data.

SUMMARY OF THE INVENTION

It is an object of the present invention to eliminate all the foregoing disadvantages of the prior art. According to the present invention, a single-lens reflex camera is provided with a mirror which is capable of vertical movement in response to movement of a shutter. The movable mirror is disposed in a data-photographing optical path and may be maintained in raised position for a predetermined time, during which the image of picture data illuminated by a light source may be projected and recorded on the surface of a sensitive film in the camera.

BRIEF DESCRIPTION OF THE DRAWINGS

The above and other objects and features of the present invention will become fully apparent from the following description of an embodiment thereof taken in conjunction with the accompanying drawings, in which.

Figure 1:
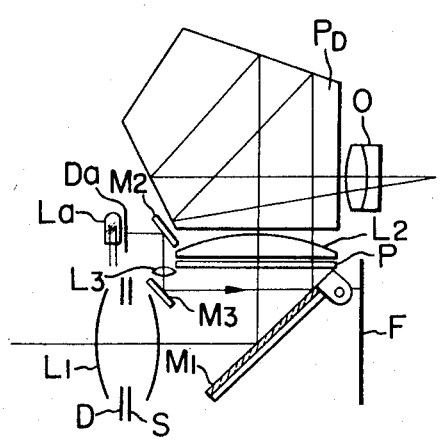
FIG. 1 schematically shows the optical arrangement of the single-lens reflex camera according to the present invention.
Figure 2:
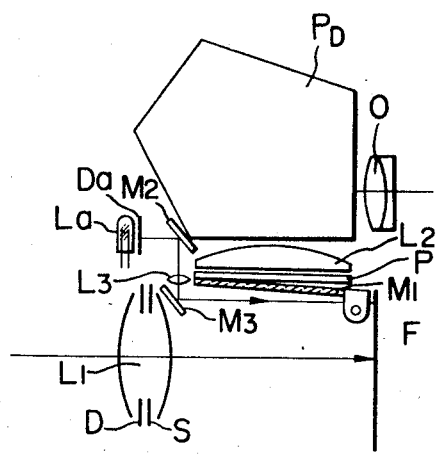
FIG. 2 illustrates the operation of the optical arrangement of the camera shown in FIG. 1.

DESCRIPTION OF THE PREFERRED EMBODIMENT:

Referring to FIGS. 1 and 2, there is shown the optical system of the single-lens reflex camera according to the present invention. The optical system includes a picture-taking lens system L1, a lens shutter S disposed in the lens system L1, diaphragm means D disposed in front of the lens shutter S, a mirror M1 serving also as a light closure for sensitive film F, a focusing screen P disposed in the image forming plane of the lens system L1, a condenser lens L2, a penta-roof prism $P_D$, and an eyepiece O. The picture-taking lens system L1, mirror M1, focusing screen P, condenser lens L2, etc. are of the construction conventionally used in known single-lens reflex cameras, and described further.

In FIGS. 1 and 2, there are further seen a data display member Da carrying thereon picture data to be photographed, an illuminating lamp La disposed behind the data display member Da, mirrors M2 and M3, and an image forming lens L3 whose focal length is such that the data image on the display member Da is focused on the film F. The lens shutter S is adapted to return to its open position after the opening and closing action of blades of the camera's shutter as will be described later. The image of an object to be photographed may be directed via mirror M1 and focusing screen P and further via prism $P_D$ to the eyepiece O, while the image of the data may be directed via mirror M2, lens L3, mirror M3 and mirror M1 to focusing screen P, where the image is focused and may be viewed through the eyepiece O.

Upon depression of a release button which will be described, the lens shutter S is first closed to establish a light-tight condition, during which the mirror M1 is then raised from its position of FIG. 1 to the position as shown in FIG. 2. Simultaneously with such rise of the mirror M1, the lens shutter opens and closes at a preset speed. During that time, the image of a picture data on the display member Da illuminated by the lamp La is directed via mirror M2, lens L3, mirror M3 to the upper margin of the film F, where the image of that data is focused.

The mirror M1 is adapted to maintain its raised position for a predetermined time and thereafter return to its initial position of FIG. 1 so as to re-establish a light-tight condition for the film F. Thus, the film F may be exposed to the image of the data on the display member Da for a predetermined time during which the mirror M1 maintains its raised position as shown in FIG. 2, so that the picture of the data may be taken with a predetermined density on the film F. After the said predetermined time, the mirror M1 is returned to its position of FIG. 1 for establishing a light-tight condition for the film F, and in response to such return of the mirror M1, the lens shutter S is again opened and ready for a subsequent picture-taking cycle. It will thus be noted that the lens shutter S shown in FIG. 1 is brought from its open position to its closed position upon shutter release, and at the moment the shutter S reaches its closed position, the mirror M1 is raised, whereafter the shutter S is opened and closed to expose the film F to the object and data images. The mirror M1 is maintained in its raised position for a predetermined time independently of the speed of the shutter S, whereafter it is lowered to the light-tight position, and following such downward return of the mirror M1, the shutter S is again opened to complete one cycle of the shutter operation.

Figure 3:
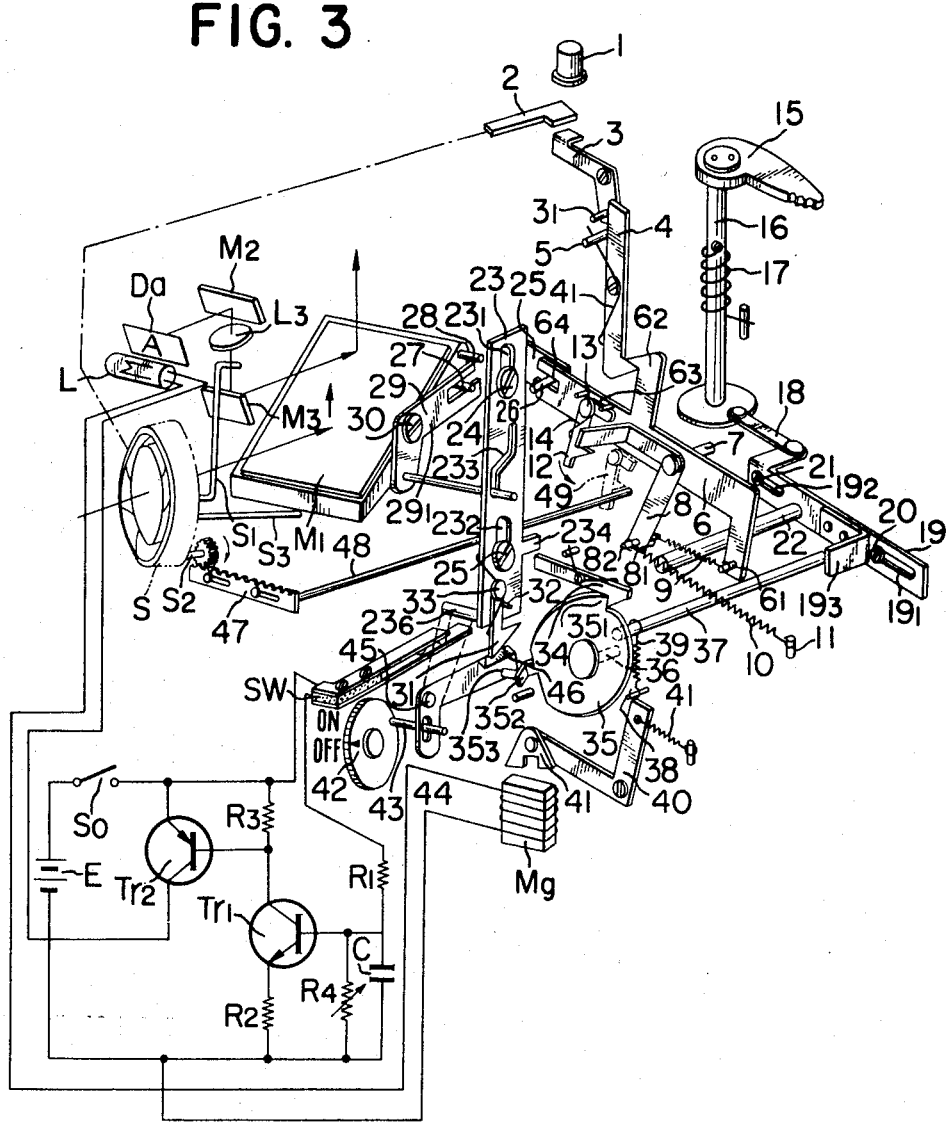
FIG. 3 shows the entire construction of the data photographing device in the single-lens reflex camera according to the present invention.

As has been described above, the shutter S is operated through a sequence of positions, i.e., open-closed-open-closed-open, but such a lens shutter for single-lens reflex cameras is known as disclosed in Japanese Pat. Publications Nos. 19779/1963 and 20680/1963 and further description thereof will be unnecessary FIG. 3 shows the construction of a mechanism for carrying out the operation described above with respect to FIGS. 1 and 2. FIG. 3 includes a release button 1, a release lever 2 operatively connected to a release member for the shutter S, a connecting lever 3 pivotally movable in response to the release lever 2 and having a studded pin $3_1$, a clamp lever 4 adapted to be actuated by the pin $3_1$ and having a return spring $4_1$ secured thereto, a stop member 5, a quick-return lever 6 pivotally connected to a camera's frame by means of a shaft 7 and having a studded pin $6_1$ and a stop pin $6_3$, a lever 8 also pivotally mounted on the shaft 7 in common to the lever 6 and having studded pins $8_1$ and $8_2$, a drive spring 9 extended between and secured to the studded pins $6_1$ and $8_1$ on the levers 6 and 8, another drive spring 10 extended between and secured to the studded pin $8_2$ on the lever 8 and a studded pin 11 on the camera's frame, a retaining lever 12 pivotally connected to the lever 6 by means of a shaft 13 biased by a spring 14, a camera's charge lever 15, a drive shaft 16 having a return spring 17 wound thereon, a reciprocally movable connecting rod 18, and a charge member 19 adapted to reciprocate in response to the connecting rod 18. The charge member 19 is formed with slots $19_1$ and $19_2$ for receiving guide pins 20 and 21 secured to the camera's frame. A charge pin 22 is mounted as a stud on the charge member 19 and projected for engagement with the base portion of the lever 8.

When the charge lever 15 is wound up, the charge member 19 is reciprocated and in response thereto, the pin 22 actuates one end of the lever 8 to rotate this lever clockwise against the force of the spring 9 while the other end of the lever 8 is retained by the retaining lever 12, thus effecting shutter charge.

A drive plate 23 for the mirror M1 is formed with linear slots $23_1$, $23_2$ and a camming slot $23_3$. The slots $23_2$ and $23_2$ cooperate with guide screws 24 and 25 received therein so as to guide the drive plate 23 and down. The plate 23 has a mating pin 26 mounted as a stud on the projection $23_5$ thereof and in engagement with a fork-like portion $6_4$ formed at one end of the lever 6. A pin 27 mounted as a stud on one side of the mirror M1, which is pivotally mounted on a shaft 28, is engaged with a fork-like portion formed at one end of a drive lever 29 pivotally mounted at the center thereof on the frame by means of a shaft 30. The drive lever 29 has a connecting pin $29_1$ mounted as a stud thereon and received in the camming slot $23_3$ formed in the drive plate 23. A retaining pawl 31 is pivotally supported on the lower portion of the plate 23 by means of a shaft 33 and biased into engagement with a stop pin 32 mounted as a stud on the plate 23 by the force of a return spring. Another retaining pawl 34 is provided in such a manner that one end thereof is engageable with a projection $23_4$ extended from the plate 23. A rotary plate 35 formed of resilient material is rotatably mounted on the frame by means of a shaft 36 and has a stepped retaining portion $35_1$ formed in a peripheral portion thereof. The rotary plate 35 further has a projection $35_2$ on which a retaining pin $35_3$ is mounted as a stud. An elongated interlocking pin 37 extends from the plate 35. A return spring 39 is extended between and secured to the pin 37 and a fixed pin 38. An L-shaped retaining lever 40 is pivotally supported on the frame and one end thereof provides an actuator 41 for an electromagnetic member Mg. The rotary plate 35 is such that when the charge lever 15 is wound up, the pin 37 on the plate 35 is engaged by the mating portion $19_3$ of the charge member 19 and thereby wound up counter-clock-wise, so that the plate 35 is rotated counter-clockwise and finally held in the position as shown in FIG. 3 by the retaining pawl 34.

A change-over dial 42 is provided outwardly of the camera's housing so as to be operable from outside the camera. The dial 42 has a pin 43 mounted as a stud thereon and received in a slot formed at one end of an L-shaped lever 44 pivotally supported by a shaft 45 studded on the frame. The lever 4 has a camming ramp 46 formed at the other end thereof. The lever 44 is such that the camming ramp 46 thereof assumes a position as indicated by the solid line in FIG. 3 when the dial 42 is set in the "OFF" position, and the camming ramp 46 is displaced to a position as indicated by the dotted line when the dial 42 is set in the "ON" position. S1, S2 and S3 respectively refer to a release member for opening the lens shutter S, a shaft responsive to a closing signal from the lens shutter S, and a release member for fully re-opening the lens shutter S. An interlocking rack 47 has a connecting pin 48 extending therefrom and connected to a member 49 for releasing the retaining lever 12.

A normally closed switch Sw is provided which may be engaged and opened by a pin $23_6$ mounted as a stud on the plate 23. A resistor R1 and a capacitor C together constitute a time constant circuit. A variable resistor $R_4$4 is parallel-connected with the capacitor C. The resistance value of the resistor $R_4$ is preset so that the value of CR, i.e., product of the capacity of C and the resistance $R_4$ provides a proper exposure time for picture data in relation to the brightness of the lamp L. Further provided are switching transistors Tr1, Tr2, main switch So and a power source such as battery E. Lamp L and electromagnetic member Mg are serially connected with the collector of the transistor Tr2. Protective resistors $R_2$ and $R_3$ are provided for controlling the base current flowing through the respective transformers Tr1 and Tr2 so as to avoid excessive flow therethrough.

When the above-described arrangement is used to photograph picture data on the film, the dial 42 is changed over to the "ON" position to displace the camming ramp 46 of the lever 44 to the dotted-line position so that the camming ramp 46 moves out of the circular locus of the pin $35_3$ on the rotary plate 35. Subsequently, the charge lever 15 is wound up against the force of the return spring 17 to set each member to the position as shown in FIG. 1. The main switch So is then closed to instantaneously pass a charging current from the power source E to the capacitor C, which is thus electrically charged so that the transistor Tr1 and accordingly the transistor Tr2 energizes the lamp L and the electromagnetic member Mg. As a result, the electromagnetic member Mg attracts and holds the actuator 41 while the lamp L illuminates data Da to be photographed (shown as A in FIG. 3) so that the data may be recorded on the film.

Figure 5:
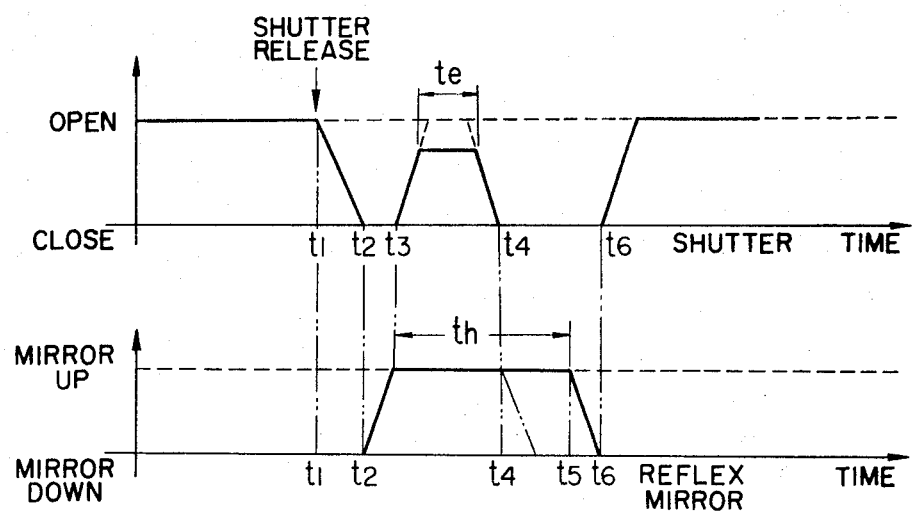
FIG. 5 is a chart illustrating the operation of the shutter and mirror incorporated in the device of FIG. 3.

Subsequently, the release button 1 is depressed to release the lens shutter S by means of the release member 2. As seen from FIG. 5, the shutter is released at a point of time $t_1$ and thereafter the shutter blades are closed at a point of time $t_2$. At a second stage of depression of the release button 1, the quick-return lever 6 is released by means of connecting lever 3 and clamp lever 4 and rotated counter-clock-wise about the shaft 7 by the forces of springs 9 and 10, so that the drive plate 23 is lowered by means of pin $6_4$ to thereby release the retaining pawl 34 by movement of projection $23_4$. Upon release of the retaining pawl 34, the rotary plate 35 is rotated clockwise by the force of spring 39 until the stepped retaining portion $35_1$ of the plate 35 is engaged by one end of the retaining lever 40 to stop the plate 35, while the retaining pawl 31 on the drive plate 23 engages and retains the pin $35_3$.

Figure 4:
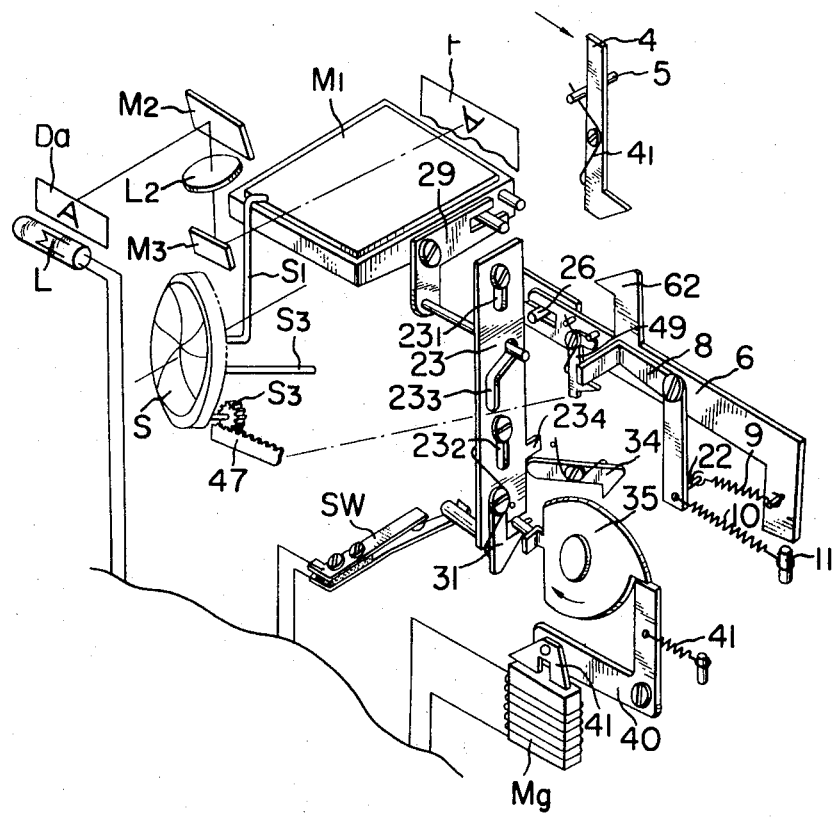
FIG. 4 illustrates the operation of the device shown in FIG. 3.

With the lowering of the drive plate 23, the camming portion $23_3$ is lowered so that the lever 29 is rotated counterclockwise by means of pin $29_1$, thereby raising the mirror M1 (see FIG. 4). As a result, the film F begins to be exposed to the image of the data on the data display member Da as described previously.

In the raised position of the mirror M1, the shutter release member S1 is started so that the shutter begins to open at a point of time $t_3$ (FIG. 5) and maintains its open position for a shutter time $t$, whereafter it is closed at a point of time $t_4$. The shutter time $t_3$ is preset on the part of the lens shutter S by a known setting mechanism (not shown). When the blades of the shutter S are closed again, the movement of the shaft S2 responsive to the closing signal is transmitted to the release member 49 via rack 47 and pin 48 so as to release retaining lever 12 which then releases lever 8.

When the mirror M1 is in its raised position as shown in FIG. 4, the free end of the lever 8 is in abutment with the charge pin 22 and therefore, the release of the retaining lever 12 allows the lever 6 to be biased for clockwise rotation by the force of spring 9. However, the drive plate 23 cannot be returned upwardly by the force of spring 9 because the retaining pin 31 on the drive plate 23 is retained by the pin $35_3$, and thus the drive plate 23 is still held by the electromagnetic member Mg even after the shutter S has completed its opening-closing action. On the other hand, the switch Sw is opened by the drive plate 23 upon raising of the mirror M1, so that the charges stored in the capacitor C are discharged through the variable resistor $R_4$. CR, the product of the capacity of C and the resistance of $R_4$. is preset in relation to the sensitivity of film F in use so that proper exposure of the data Da may be provided by the light from lamp L (time $t_h$ in FIG. 5). Accordingly, the mirror M1 is maintained in its raised position and exposure continues for a time $t_h$ to provide proper exposure on the film F, whereafter the switching transistor Tr1 detects the terminal voltage drop across the capacitor C resulting from its discharge and is rendered non-conductive to deenergize the electromagnetic member Mg. Thus, the actuator 41 is released from the electromagnetic member to allow the lever 40 to be rotated clockwise by the force of return spring 41, so that the end of the lever 40 is disengaged from the stepped retaining portion $35_1$ of the rotary plate 35, which is now rotated clockwise by the force of spring 39. As a result, the engagement between the retaining pawl 31 and the pin $35_3$ is also released to allow the drive plate 23 to be displaced upwardly by the force of spring 9. The result is that the mirror M1 is lowered by means of pin $29_1$ and lever 29 to return to its initial position (point of time $t_6$ in FIG. 5), thereby actuating the release member S3 for operating the lens shutter S so as to fully open the shutter again.

As will be appreciated from the foregoing, the time during which the mirror M1 is maintained in its raised position, that is, the time during which the data on the data display member Da is exposed on the film F corresponds to the predetermind time during which the capacitor C discharges to reduce its terminal voltage to turn off the switching transistor Tr1. This is provided by the resistance value of the variable resistor $R_4$ parallel-connected with the capacitor C to form a discharge circuit being preset in accordance with the ASA value of the film. Therefore, if the illumination of the lamp L is uniform, proper exposure may be achieved irrespective of the exposure time of the shutter S or the shutter speed.

Where the picture data need not be photographed, the change-over dial 42 is rotated to the set its index to "OFF" position. In response to such rotation of the dial 42, the camming ramp 46 of the lever 44 shifts to the solid-line position in FIG. 3, so that the pin $35_3$ on the rotary plate 35 rides on the camming ramp 46 to reach the position as shown in FIG. 3 when the plate 35 is rotated counter-clockwise against the force of spring 39 in response to the movement of the shutter charge lever 15. As a result, the drive plate 23 is lowered as described above, but the retaining pawl 31 thereof is not brought into engagement with the pin $35_3$ although it slides downwardly along the camming ramp 46, since the pin $35_3$ is then moved away from the locus of the retaining pawl 31 by the camming ramp 46. Thus, the drive plate 35 operates independently of the rotary plate 35. Accordngly, the mirror M1 is released by the release member S2 in accordance with the closing movement of the shutter S after the shutter has completed its opening-closing action for exposing the film to the image of an object to be photographed, whereby the mirror M1 is allowed to be lowered.

Thus, according to the present invention, the mirror M1 is held in its raised position for a predetermined time independently of the shutter speed so as to enable the image of the picture data to be properly exposed on the film within that predetermined time, whereafter the mirror is returned to its normal position. Therefore, uniform picture of the date can be achieved for a wide range of brightness of the objects to be photographed.

While the light source L and the electrogmatic member Mg have been shown to be connected together in the illustrated embodiment, it will be apparent that the lamp L may be separately connected so as to turn on normally and the electromagnetic member alone may be controlled to obtain the same result as described above.

I claim:

1. A single-lens reflex camera provided with a data photographing device for photographing the image of an object and the image of data separate from said object on a common film by opening and closing a shutter, comprising:

exposure control means including a shutter and means for applying correct exposure to a film by opening-closing of said shutter;

means for driving a movable mirror for a viewfinder, said drive means having a drive member engaged with said movable mirror to drive and displace said mirror between'a viewfinder-using position in which said mirror reflects light from the object to the optical path of the viewfinder and an exposure-using position in which said mirror is out of the optical path for forming the image of the object;

data photographing means including a carrier member carrying thereon data to be photographed, a light source for illuminating said carrier member and an optical system for projecting the image of the data of said data carrier member on a film, said movable mirror in said viewfinder-using position being disposed in said optical system so as to close the optical path to the film, said mirror in said exposure-using position allowing the film to be exposed to the image of said object and said data; and means separate from said drive means and connectable therewith to hold said movable mirror in said exposure-using position for a predetermined time to expose the film to the image of the object during the opening and closing of the shutter, said holding means including delay means and a holding element operable to hold said drive member in said exposure-using position for an additional time beyond said predetermined time;

whereby the image of said data may be exposed on the film for correct exposure time while said mirror is held by said drive member.

2. A camera according to claim 1, wherein said holding means includes a release member operable from the exterior of the camera to displace said holding means into inoperative position.

3. A camera according to claim 1, wherein said delay means in said holding means comprises an electrical circuit consisting of a time limit circuit and a switching circuit and further includes a trigger switch actuated in response to movement of said drive member, said switch being connected as a start switch for said time limit circuit, and wherein said holding means further includes an electromagnetic member connected with the output of said switching circuit, said holding member being disposed within the operating range of said electromagnetic member.

4. A camera according to claim 3, wherein said light source is connected with the output of said switching circuit through said electromagnetic member.

5. A single-lens reflex camera provided with a data photographing device for photographing the image of an object and the image of data separate from said object on a common film by opening and closing a shutter, comprising:

exposure control means including a shutter and means for applying correct exposure to a film by opening-closing of said shutter;

means for driving a movable mirror for a viewfinder, said drive means having a drive member engaged with said movable mirror to drive and displace said mirror between a viewfinder-using position in which said mirror reflects light from the object to the optical path of the viewfinder and an exposure-using position in which said mirror is out of the optical path for forming the image of the object;

data photographing means including a carrier member carrying thereon data to be photographed, a light source for illuminating said carrier member and an optical system for projecting the image of the data of said data carrier member on a film, said movable mirror in said viewfinder-using position being disposed in said optical system so as to close the optical path to the film, said mirror in said exposure-using position allowing the film to be exposed to the image of said object and said data;

means separate from said drive means and connectable therewith to hold said movable mirror in said exposure-using position for a predetermined time to expose the film to the image of the object during the opening and closing of the shutter, said holding means including delay means and a holding element operable to hold said drive member in said exposure-using position for an additional time beyond said predetermined time whereby the image of said data may be exposed on the film for correct exposure time while said mirror is held by said drive member; and said holding element is defined by:

a rotary member resiliently biased in one direction in response to shutter charge, said rotary member being formed with a first and a second retainig portion;

a first retaining member engageable with said first retaining portion of said rotary member to hold said rotary member in charged position, said first retaining member being disengageable from said rotary member by its displacement corresponding to the displacement of said movable mirror to said exposure-using position caused by said drive member;

said mirror drive means having a retaining portion formed on said drive member, said retaining portion being engageable with said second retaining portion of said rotary member when the latter member is released and rotated;

said holding member being provided for moving into the locus of said first retaining portion so as to retain said first retaining portion when said rotary member is released and rotated to allow said second retaining portion to be engaged by said retaining portion of said drive member.

6. A camera according to claim 5, wherein said holding means further includes a release member operable for displacement from the exterior of the camera, said release member in its operative position being engaged with said second retaining portion to shift the latter into a position for preventing its engagement with said retaining portion of said drive member.

* * * * *